(12) United States Patent
Daudelin et al.

(10) Patent No.: US 12,014,525 B2
(45) Date of Patent: Jun. 18, 2024

(54) MULTIMODAL SENSOR MEASUREMENT FUSION THROUGH A COMBINED GEOMETRICAL APPROACH OF TIME WARPING AND OCCLUSION SURFACE RAY PROJECTION

(71) Applicant: TOYOTA RESEARCH INSTITUTE, INC., Los Altos, CA (US)

(72) Inventors: Jonathan A. Daudelin, Ann Arbor, MI (US); Matthew T. Kliemann, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 835 days.

(21) Appl. No.: 17/143,562

(22) Filed: Jan. 7, 2021

(65) Prior Publication Data

US 2022/0215590 A1 Jul. 7, 2022

(51) Int. Cl.
*G06T 7/00* (2017.01)
*G06T 5/50* (2006.01)

(52) U.S. Cl.
CPC .............. *G06T 7/97* (2017.01); *G06T 5/50* (2013.01); *G06T 2200/32* (2013.01); *G06T 2207/20221* (2013.01)

(58) Field of Classification Search
CPC ......... G06T 7/97; G06T 5/50; G06T 2200/32; G06T 2207/30252; G06T 2207/20221; G06T 2207/10024; G06T 2207/10028; G06T 2207/20076
See application file for complete search history.

(56) References Cited

U.S. PATENT DOCUMENTS

| 9,129,442 B2 | 9/2015 | Aronsson et al. |
| 11,151,798 B1 * | 10/2021 | Casaburo ............... G06T 7/246 |
| 2014/0198955 A1 | 7/2014 | Deigmoeller et al. |
| 2018/0329066 A1 | 11/2018 | Pacala |

FOREIGN PATENT DOCUMENTS

| WO | 2000073995 A2 | 12/2000 |
| WO | 2016100814 A1 | 6/2016 |

OTHER PUBLICATIONS

Fused Sensing vs. Sensor Fusion (https://www.outsight.tech/technology/fused-sensing-vs.-sensorfusion); Accessed Aug. 19, 2020.

* cited by examiner

*Primary Examiner* — Mekonen T Bekele
(74) *Attorney, Agent, or Firm* — Dinsmore & Shohl LLP (57) ABSTRACT

Systems, methods, controllers, and techniques for addressing the parallax occlusion effect caused by non-collocated sensors are disclosed. A controller is configured to fuse image data received from an imaging device and depth data received from a depth sensor to form a mesh, project a ray from the imaging device to a pixel of the image data fused with a point of the depth data forming the mesh, determine an occlusion boundary surface within the depth data, and in response to determining that the ray intersects the occlusion boundary surface, determine that the imaging device is occluded from a fused point in the mesh.

20 Claims, 7 Drawing Sheets

MULTIMODAL SENSOR MEASUREMENT FUSION THROUGH A COMBINED GEOMETRICAL APPROACH OF TIME WARPING AND OCCLUSION SURFACE RAY PROJECTION

TECHNICAL FIELD

The present specification relates to systems and methods for addressing the parallax occlusion effect caused by non-collocated sensors. More specifically, embodiments of the present specification relate to systems and methods for determining whether projected rays from a camera intersect an occlusion boundary surface before reaching a fused point in a mesh.

BACKGROUND

Apparatuses, such as robots, autonomous vehicles, or the like, include sensors, such as cameras, LIDAR sensors, RADAR sensors, SONAR sensors, or the like. The sensors implemented in systems such as vehicles and the like may be non-collocated within the system. Non-collocated sensors can cause a parallax occlusion effect. That is, each sensor can observe surfaces in common but one sensor may also observe surfaces that the other sensor cannot. That is, the surface that the one sensor observes but the other sensor cannot is a surface occluded from the view of the other sensor. In many systems, data from different sensors, for example, image data from a camera and point cloud data from a LIDAR system, may be fused to combine geometry obtained from the set of sensors such as LIDAR systems with semantic information obtained from image data from sensors such as cameras. However, painting processes used to fuse data from different and non-collocated sources from time-to-time result in parallax occlusion effects.

Accordingly, there is a need for systems and methods for addressing the parallax occlusion effects caused by non-collocated sensors.

SUMMARY

In one embodiment, a controller configured to fuse image data received from an imaging device and depth data received from a depth sensor to form a mesh, project a ray from the imaging device to a pixel of the image data fused with a point of the depth data forming the mesh, determine an occlusion boundary surface within the depth data, and in response to determining that the ray intersects the occlusion boundary surface, determine that the imaging device is occluded from a fused point in the mesh.

In some embodiments, a method includes fusing image data received from an imaging device and depth data received from a depth sensor to form a mesh, projecting a ray from the imaging device to a pixel of the image data fused with a point of the depth data forming the mesh, determining an occlusion boundary surface within the depth data, and in response to determining that the ray intersects the occlusion boundary surface, determine that the imaging device is occluded from a fused point in the mesh.

In some embodiments, a vehicle may include a controller, an imaging device and a depth sensor communicatively coupled to the controller. The controller is configured to receive image data from the imaging device and depth data from the depth sensor, fuse the image data and the depth data forming a mesh, project a ray from the imaging device to a pixel of the image data fused with a point of the depth data forming the mesh, determine an occlusion boundary surface within the depth data, determine whether the ray intersects the occlusion boundary surface, and in response to determining that the ray intersects the occlusion boundary surface, determine that the imaging device is occluded from a fused point in the mesh.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for addressing the parallax occlusion effect caused by non-collocated sensors. Embodiments include systems and methods that utilize ray projection from a first sensor such as an imaging device to points in a mesh for determining whether the sensor is occluded from viewing the point in the mesh defined by data from a second sensor. For example, the systems and methods disclosed herein include fusing sensor data from a first and second sensor, for example positioned on a vehicle with known extrinsic and intrinsic calibration values for the at least two sensors. Based on the extrinsic calibration of the at least two sensors, geometry defining the positional relationship between the at least two sensors can be determined. That is, the two sensors are non-collocated.

Non-collocated sensors cause a parallax occlusion effect when the sensor data from each sensor is fused to form a mesh. For example, a mesh (e.g. a 3D mesh) may include image data of an environment from the first sensor such as an imaging device fused with depth information about the environment obtained from the second sensor such as a LIDAR system, a RADAR system, a depth imaging device or the like. Each sensor can observe a common environment, but each sensor may observe and capture data of the common environment from different points of view. The different points of view may result in a first sensor being occluded from viewing all of the same surfaces as the second sensor. That is, the surface that the second sensor observes may be a surface occluded from the view of the first sensor because an object is occluding the view of the first sensor, but not the view of the second sensor.

When parallax occlusion effects are present within fused data sets, the results may cause incorrect fusing between data from the two or more sensors. For example, a semantic label associated with a pixel or a group of pixels may be incorrectly assigned to a depth point (e.g., a point cloud point) within a mesh of the two data sets. Furthermore, the timing of data collection of the multiple data sets being fused into a mesh and/or the sparsity of data collection may further complicate accurate fusing of the data.

Regarding the timing of data collection, each sensor, for example an imaging device and a LIDAR system, may capture data at different frequencies. Moreover, the implementation of the imaging sensor and the LIDAR system may further inherently cause data within the same portion of an environment to be captured at different time intervals. For example, some LIDAR systems sweep through an environment by rotating and/or pitching emitter and detector portions of the LIDAR system in order to generate a field of view of the environment. That means, a first point cloud point captured when the emitter and detector are directed at a first location (e.g., at a heading of 0 degrees) will be captured before a second point cloud point that is captured when the emitter and detector are directed at a second location (e.g., at a heading of 25 degrees) because the LIDAR system sweeps the emitter and detector through an environment to generate a field of view of the environment. Meanwhile, the imaging device may be in a fixed location on, for example, a vehicle, and configured to continuously and at a predetermined frequency (e.g., frames per second) capture image data of the environment in the direction corresponding to the fixed location on the vehicle. Accordingly, the time stamps associated with each image pixel and point cloud point need to be reconciled when fusing one or more image pixels with one or more point cloud points. The time stamps as discussed in more detail herein enable the systems and methods to more accurately associate data from various sensors when generating a 3D mesh that may further be semantically labeled.

Moreover, since the systems and methods described herein are contemplated for use in dynamic environments such as a vehicle driving along a street within a city where people and other objects are moving about, the process of fusing image data and depth data corresponding to the environment must not only be matched within a predetermined time frame, but may have to be updated as the environment changes. Without sensor synchronization or interpolation correction, non-stationary objects in the scene can move during data acquisition. This can result in non-equivalent capturing of data. For example, an oncoming vehicle moving at 30 m/s may be first sampled by a LIDAR system at 0 ms and by the imaging device at 50 ms. From the time the oncoming vehicle was sample by the LIDAR system to the time it was sampled by the imaging device, the vehicle may have traversed 1.5 m. Fusing, or in other words, projecting the data from the first sensor (e.g., LIDAR system) into the data from the second sensor (e.g., imaging device) may fail because the oncoming vehicle has moved to a different detectable location between the sampling times of each sensor.

Embodiments described herein further propose utilizing optical flow and image warping in order to approximate the image device data at any time, t, for the point being projected to the image. For example, if time, t, lies between two frames of image data, flow within the scene, between the two timestamps, can be interpolated and then warping of the image data at the first frame may be computed using the interpolated flow vector. In some instances, if time, t, lies after the most recent received image frame, flow may be extrapolated by using the running flow between the frames of image data at t−1 and t−2. Then, by applying the inverse flow vector to the last frame, warping of the last received image frame may be computed. In some embodiments, flow may also provide an uncertainty flag for each image pixel indicating if a time match was found while fusing the pixel with point cloud data. The flag may trigger the execution of one of the above described methods or other methods of warping the image data to generate a better estimation of the objects in the image data and thus the mesh at time, t.

In some embodiments, the system can also interpolate the corresponding camera pose at the target time, t, through spherical linear interpolation, SLERP, in order to have a full transformation between the point clouds captured at different time intervals. It should be understood that although the aforementioned processes were described with respect to image data, it is also possible to warp point cloud points to a corresponding image timestamp by computing flow in a similar manner. Furthermore, although flow and warping computations, in some cases, may not completely reconcile the rolling shutter nature of some LIDAR systems or cameras, the processes provide markers or flags that highlight the potential uncertainty in point to pixel mesh fusion.

In addition to addressing the potential difference between timestamps of data being fused into the mesh, there are also considerations for the differences in sparsity of data. Sparsity of data refers to the fact that for every image pixel captured of an environment there may not be a corresponding depth data point (e.g., point cloud point when using a LIDAR system) to fuse. In other words, image data may have a predefined resolution that is greater than and more uniform than the depth data generated by a LIDAR system. Accordingly, there may be one or more pixels that are near a single point in the depth data. Embodiments may address the sparsity of data by one or a number of processes. The following provides a non-exhaustive set of examples. For example, in one embodiment, groups of pixels around point in the depth data may be selected and fused. In other embodiments, the nearest pixel may be selected and fused with the point in the depth data. While in some embodiments, only semantically similar pixels that are near the point in the depth data may be selected and fused.

A more detailed description of embodiments of systems and methods for addressing the parallax occlusion effect caused by non-collocated sensors with reference to the figures will now be described. Embodiments include systems and methods that utilize ray projection from a first sensor such as an imaging device to points in a mesh for determining whether the sensor is occluded from viewing a point in the mesh defined by data from a second sensor.

Figure 1:
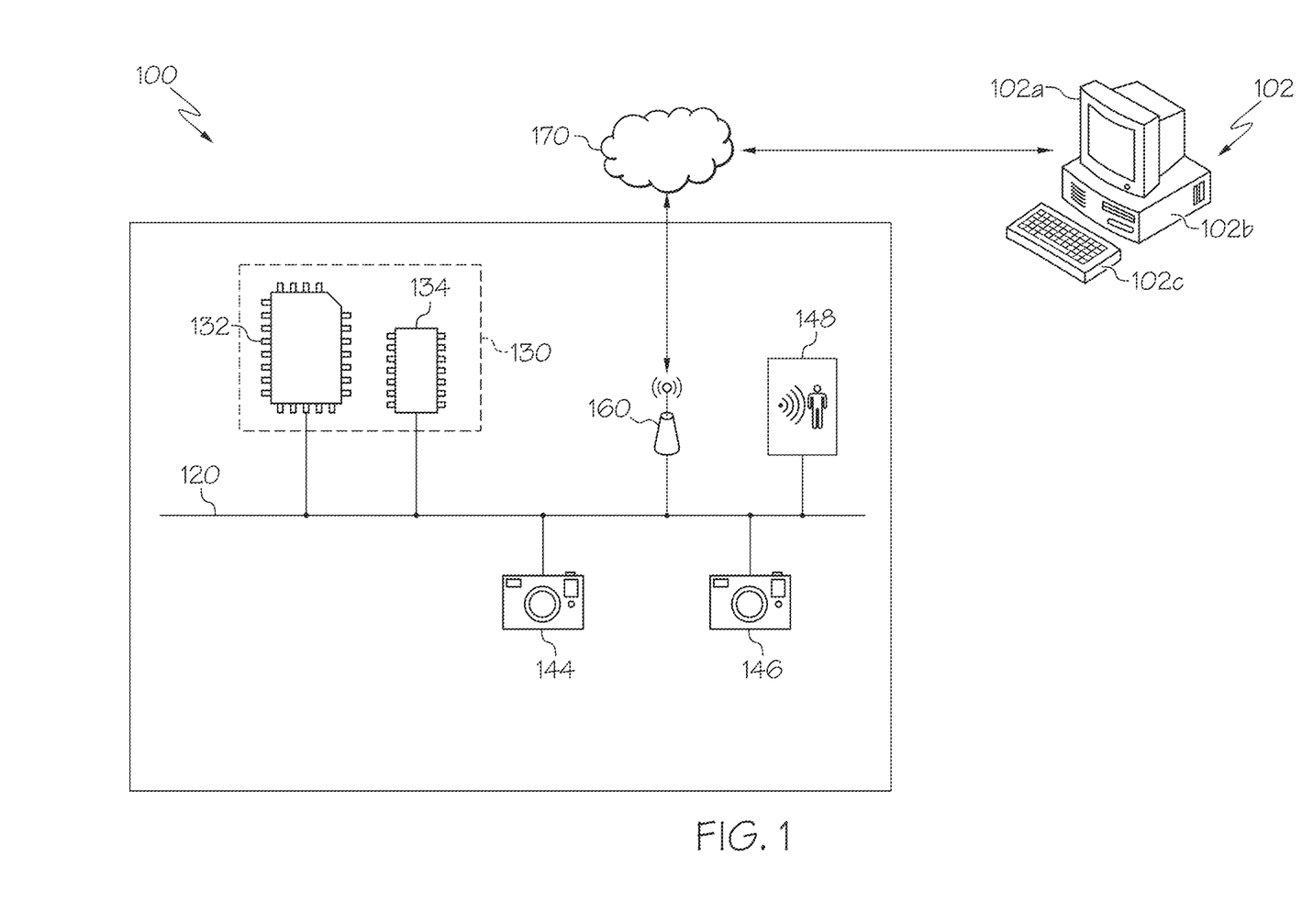
FIG. 1 schematically depicts components of a system for addressing the parallax occlusion effect caused by non-collocated sensors according to one or more embodiments shown and described herein.
Figure 2:
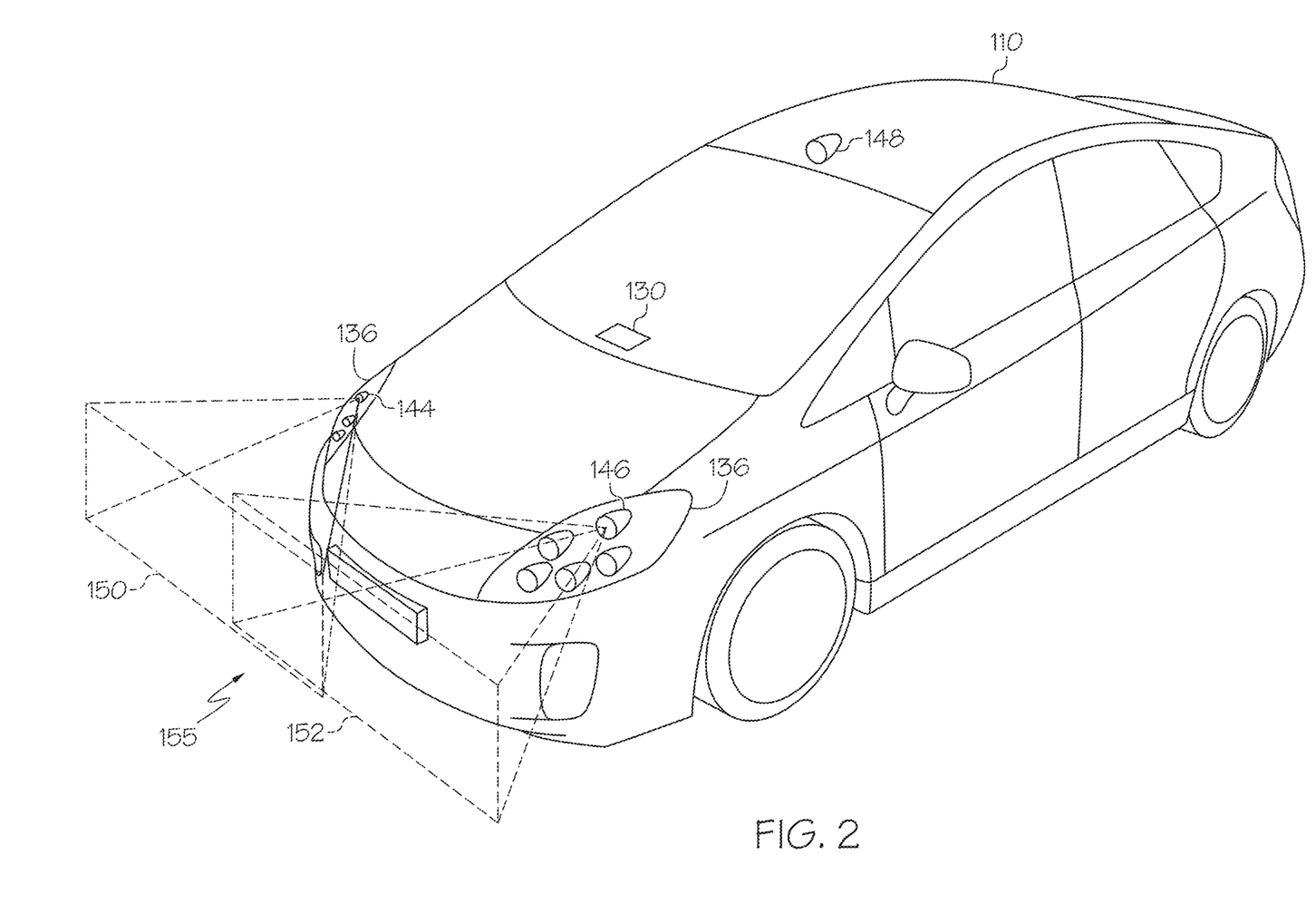
FIG. 2 depicts an illustrative environment and vehicle implementing a system for addressing the parallax occlusion effect caused by non-collocated sensors according to one or more embodiments shown and described herein.

Turning now to the drawings wherein like numbers refer to like structures, and particularly to FIGS. 1 and 2, FIG. 1 schematically depicts components of a system 100 for addressing the parallax occlusion effect caused by non-collocated sensors. FIG. 2 illustratively depicts an example implementation of the system 100 in a vehicle 110. The embodiments described herein are directed to implementation of the system 100 in a vehicle 110, however, this is merely an example implementation as other electronic devices such as robots, aircraft, other transportation vehicles, security or monitoring systems, mapping systems, or the like may utilize the systems and methods for addressing the parallax occlusion effect caused by non-collocated sensors as disclosed herein.

The system 100 for addressing the parallax occlusion effect caused by non-collocated sensors located on a vehicle 110 includes, a communication path 120, an electronic control unit 130 having a processor 132 and a non-transitory computer readable memory 134, one or more imaging devices 144, 146 (also referred to herein as the first image sensor 144 and the second image sensor 146), one or more depth sensors 148 such as a RADAR system, a SONAR system, a LIDAR system or the like, and network interface hardware 160. The system 100 may be communicatively coupled to a network 170 by way of the network interface hardware 160. The components of the system 100 may be contained within or mounted to a vehicle 110. The various components of the system 100 and the interaction thereof will be described in detail below.

The network 170 may operate to connect the system 100 with one or more computing devices 102. The computing device 102 may include a display 102a, a processing unit 102b and an input device 102c, each of which may be communicatively coupled to together and/or to the network 170. The computing device 102 may be utilized to configure the system 100 and/or provide information such as semantic labeling support for image data or other functionality that may be handled in an offline environment (i.e., outside of the vehicle 110), which will be described in more detail herein.

Referring to the system 100, the communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The electronic control unit 130 may also be referred to generally as a controller. The processor 132 of the system 100 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer readable memory 134 of the system 100 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. Additionally, the functionality described herein may be implemented within a computer program product that when executed by a processor of a controller may cause the system to perform the functionality defined therein. While the embodiment depicted in FIG. 1 includes a single non-transitory computer readable memory 134, other embodiments may include more than one memory module.

Still referring to FIGS. 1 and 2, the one or more imaging devices 144, 146 are coupled to the communication path 120 and communicatively coupled to the electronic control unit 130 and consequently the processor 132 and non-transitory computer readable memory 134. Each of the one or more imaging devices 144, 146 may be a camera or any device having an array of sensing devices (e.g., pixels) capable of detecting radiation in an ultraviolet wavelength band, a visible light wavelength band, or an infrared wavelength band. Each of the one or more imaging devices 144, 146 may include or be associated with a night vision system or low light system. Each of the one or more imaging devices 144, 146 may have any resolution; however, high resolution may provide for enhanced light and object identification and detection. Each of the one or more imaging devices 144, 146 may be an omni-directional camera, or a panoramic camera. In some embodiments, one or more optical components, such as a mirror, fish-eye lens, or any other type of lens may be optically coupled to each of the one or more imaging devices 144, 146. Each of the one or more imaging devices 144, 146 may be positioned within or on the vehicle 110 to view the environment external to the vehicle 110. For example, without limitation, each of the one or more imaging devices 144, 146 may be positioned on the dashboard of the vehicle 110 or within the vehicle headlamp units 136 to capture images of the surroundings in front, alongside, behind, above, or below the vehicle 110 during operation. The position of each of the one or more imaging devices 144, 146 is not limited to the dashboard or the vehicle headlamp units 136 of the vehicle 110. Each of the one or more imaging devices 144, 146 may be positioned anywhere on or within the vehicle 110 to capture images of surroundings of the vehicle 110 during operation.

The one or more imaging devices 144, 146 are implemented to capture images of the surroundings of the vehicle and generate image data that is communicated to the electronic control unit 130 and processor 132. During normal operation, the image data may be received by the processor 132, which process the image data using one or more image recognition, object recognition, and/or other image processing algorithms. The image data may be semantically labeled by pixel or groups of pixels. Any known or yet-to-be developed video or image recognition, object recognition, and/or other image processing algorithms may be implemented by the electronic control unit 130 to identify features within the image data and semantically label the same. Moreover, any known or yet-to-be-developed object recognition algorithms or facial recognition algorithms may be used to extract the objects and features from the image data. Example object recognition algorithms or facial recognition algorithms include, but are not limited to, structure from motion ("SFM"), scale-invariant feature transform ("SIFT"), speeded up robust features ("SURF"), and edge-detection algorithms. The object recognition algorithms or facial recognition algorithms may be stored in the non-transitory computer readable memory 134 and executed by the processor 132. Additionally, the image data may be captured in a continuous succession at a predefined frame rate (e.g., at a frequency). In some embodiments, where more than one imaging device is utilized to capture image data of the environment, the image data from each of the imaging devices 144, 146 may be stitched together to form a larger field-of-view image of the environment.

In some embodiments, the system 100 may include a depth sensor 148. The depth sensor 148 may be any sensor capable of determining a distance from the depth sensor 148 to an object or feature in an environment. The depth sensor 148 may be independent sensor device such as a RADAR system, a SONAR system, a LIDAR system or the like. The depth sensor 148 may also be configured with the one or more imaging devices 144, 146, where by IR image data or RGB image data captured by the one or more imaging devices 144, 146 may be utilized to determine distances (e.g., depths) within an environment.

Still referring to FIGS. 1 and 2, the system 100 includes network interface hardware 160 coupled to the communication path 120 and communicatively coupled to the electronic control unit 130. The network interface hardware 160 may be any device capable of transmitting and/or receiving data via a network 170. Accordingly, network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 160 includes hardware configured to operate in accordance with the Bluetooth wireless communication protocol. In another embodiment, network interface hardware 160 may include a Bluetooth send/receive module for sending and receiving Bluetooth communications to/from a network 170. The network interface hardware 160 may also include a radio frequency identification ("RFID") reader configured to interrogate and read RFID tags.

In some embodiments, the system 100 may be communicatively coupled to nearby vehicles via the network 170. In some embodiments, the network 170 is a personal area network that utilizes Bluetooth technology to communicatively couple the system 100 and the nearby vehicles. In other embodiments, the network 170 may include one or more computer networks (e.g., a personal area network, a local area network, or a wide area network), cellular networks, satellite networks and/or a global positioning system and combinations thereof. Accordingly, the system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The following sections will now describe embodiments of the operation of the system 100 for addressing the parallax occlusion effect caused by non-collocated sensors. A vehicle 110 may have one or more imaging devices 144, 146 and one or more depth sensors 148. For example, but without limitation, the first image sensor 144 and the second image sensor 146 may be disposed with respective vehicle headlight units 136. The fields of view of each of the first image sensor 144 and the second image sensor 146 are depicted forming an area of capture defining a first image 150 and a second image 152. Based on the positions and fields of view of each of the first image sensor 144 and the second image sensor 146, an overlapping portion 155 is formed. The overlapping portion 155 may be utilized to stitch one or more sets of image data together. However, for purposes of explanation, the embodiments described herein will be described with reference to a single depth sensor 148 and a single imaging device 146.

Figure 3A:
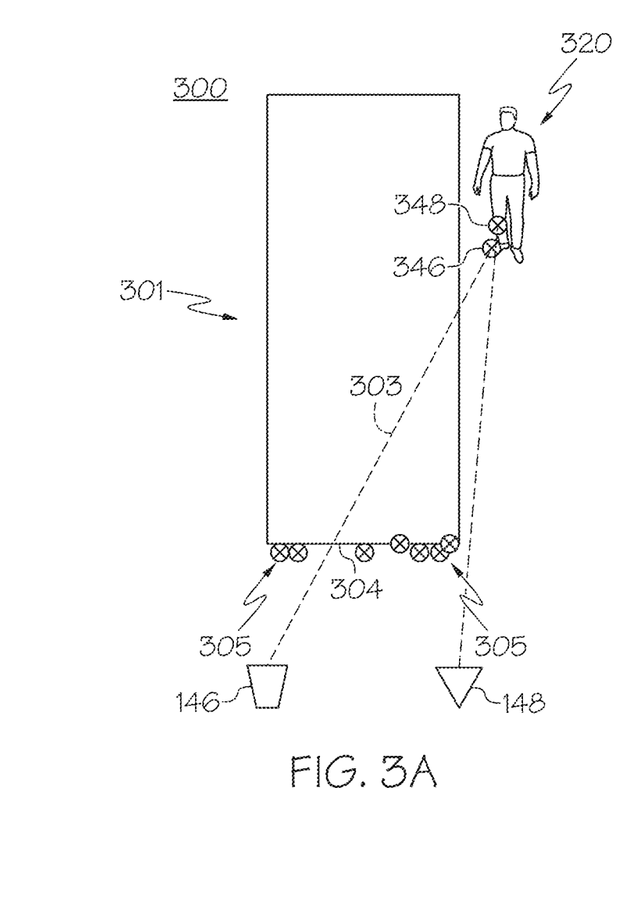
FIG. 3A illustrates a schematic depicting an example of the parallax occlusion effect caused by non-collocated sensors according to one or more embodiments shown and described herein.
Figure 3B:
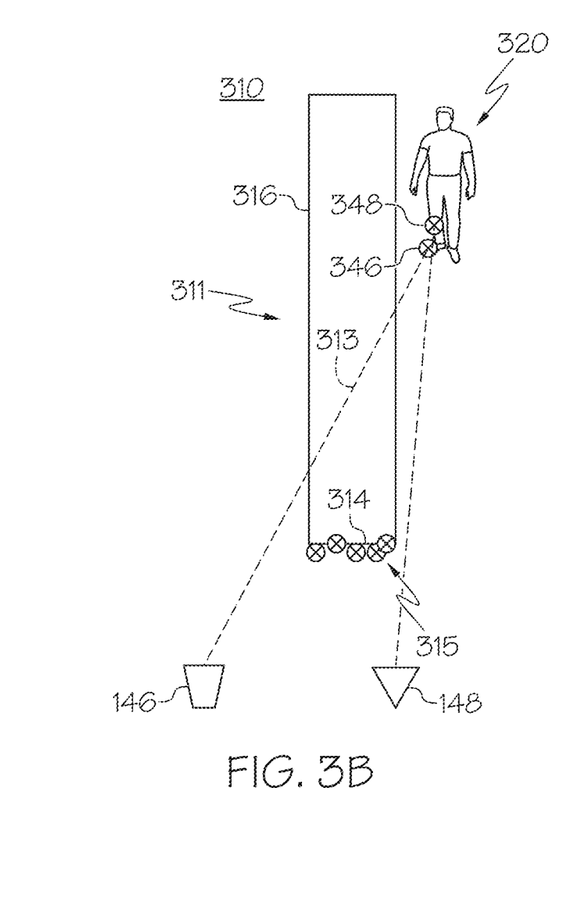
FIG. 3B illustrates a schematic depicting another example of the parallax occlusion effect caused by non-collocated sensors according to one or more embodiments shown and described herein.

FIGS. 3A and 3B illustrate schematics depicting the parallax occlusion effect caused by non-collocated sensors. FIG. 3A depicts an imaging device 146 and a depth sensor 148 that have captured image data and depth data of a common environment 300. The environment 300 includes an object 301 and a person 320. In some instances, when the depth data and the image data are fused a bleeding issue can arise where a pixel or a group of pixels 346 is fused to the a point 348 in the depth data where the image data is actually occluded from viewing the same or similar area defined by the point 348 in the depth data. As used herein "bleeding"

refers to the classification or semantic labeling of a point 348 in the depth data based on image data that is occluded from viewing the point 348 defined by the depth data for the environment 300. For example, as shown in FIG. 3A, the pixel 346 captured by the imaging device 146 does not correspond to the point 348 captured by the depth sensor 148. The bleeding effect depicted in environment 300 may result from the sparsity of points 305 available in the depth data. That is, there are seven point 305 that generally define a surface. However, due to the sparsity of the points 305 captured by the depth sensor 148 there is a gap between a number of the points 305 which my make it appear to a system that there is no closer point (e.g., no closer object) along a projected ray 303 between the imaging device 146 and the pixel 346 than point 348. However, that is not the case. Instead of relying solely painting functions that may fuse pixels 346 with points 348 by assigning a pixel 346 and point 348 correspondence based on the nearest point 348 along a projected ray 303 between the imaging device 146 and the pixel 346, embodiments described herein determine and define one or more occlusion boundary surfaces 304 within the depth data from the depth sensor 148 to determine whether the fused pixels 346 and points 348 should be associated. That is, the electronic control unit 130 of the system 100 may determine that the points 305 define a surface and in response the surface may be classified as an occlusion boundary surface 304.

An occlusion boundary surface 304 may be determined by comparing the geometric relationships between points within the depth data in view of a predefined maximum separation value. The predefined maximum separation value may be tunable by a user depending on the type of depth sensor 148. Since each point defined in depth data defines a distance from the depth sensor 148 to the surface of an object in an environment, the electronic control unit 130 may compute the separation distance between points and determine whether a series of points define a plane or surface. Since the sparsity of points increases as a function of distance from the depth sensor 148, the predefined maximum separation value may also be adjusted based on the distance from the depth sensor 148. In other words, two points having a first separation value that are close in distance to the depth sensor 148 may define a portion of a first surface while two points having a second separation value (i.e., which is larger than the first separation value) that are far in distance from the depth sensor 148 may also define a portion of a second surface although the second separation value is larger than the first separation value. Accordingly, the predefined maximum separation value for a point close to the depth sensor 148 may be smaller than the predefined maximum separation value for point far from the depth sensor 148.

As will be described in more detail herein, once an occlusion boundary surface 304 is defined, the system may determine whether the projected ray 303 from the imaging device 146 to the pixel 346 intersects the occlusion boundary surface 304. In a case in which the projected ray 303 intersects the occlusion boundary surface 304, the electronic control unit 130 may determine that the imaging device 146 may be occluded from viewing any surface beyond the surface defined by the occlusion boundary surface 304.

Therefore, the electronic control unit 130 determines that the point 348 visible to the depth sensor 148 should not likely be fused and/or labeled with the pixel 346 (or group of pixels) and their corresponding semantic label from the image data. It is understood that in some instances, the determination is a prediction since the determination of the occlusion boundary may have some variability due to the sparsity or timing of the points captured in the depth data. Moreover, in some instance, as described above, an amount of time exist between the time at which the point in the depth data and the image data was captured thus allowing dynamic objects within the environment to move between the acquisition time intervals of the depth sensor 148 and the imaging device 146.

Referring now to FIG. 3B, a similar scenario as depicted in FIG. 3A is shown. FIG. 3B depicts an environment 310 that includes an object 311 and the person 320. In some instances, when the depth data and the image data are fused a bleeding issue can arise where a pixel or a group of pixels 346 are fused to the a point 348 in the depth data where the image data is actually occluded from viewing the same or similar area defined by the point 348 in the depth data.

For example, as shown in FIG. 3A, the pixel 346 captured by the imaging device 146 does not correspond to the point 348 captured by the depth sensor 148. That is, the bleeding effect depicted in environment 300 results from the lack of points 315 in the depth data to define a volume 316 of an object 311. Since depth sensors 148 are generally radial in nature, meaning that they capture depth information of an environment extending from a central point where the depth sensor 148 is located, there are instances where an object 311 may be have an undefined depth because the points 315 detected by the depth sensor 148 contacted another object or a closer surface. Therefore, the system 100, to more effectively address the parallax occlusion effect caused by non-collocated sensors and the subsequent bleeding of semantic information between incorrectly fused pixels 346 and points 348, may implement a process to predict the volume 316 of an object 311. The predicted volume 316 of an object may be determined through a variety of means. In one embodiment, semantic information obtained from image data may inform the resulting mesh (e.g., 600, FIG. 6) that a surface within the mesh 600 is a vehicle, in some cases, more specifically, a rear of a vehicle. Based on the determination that a portion of the points from the depth data in the mesh correspond to a vehicle, the electronic control unit 130 may update the mesh 600 to include a predicted volume 316 for a vehicle extending from the occlusion boundary surface 314. The predicted volume 316 for a vehicle may be based on an average vehicle length and height. Once the predicted volume 316 is determined, the electronic control unit 130 of the system 100 may determine whether the projected ray 313 between the imaging device 146 and the pixel 346 intersects or travels behind the occlusion boundary surface 314 and/or intersects the predicted volume 316 extending from the occlusion boundary surface 314. If the projected ray 313 is determined to intersect or travel behind the occlusion boundary surface 314 and/or intersect the predicted volume 316, the electronic control unit 130 may determine that the imaging device 146 may be occluded from viewing any surface beyond the surface defined by the occlusion boundary surface 304. Therefore, the electronic control unit 130 determines that the point 348 visible to the depth sensor 148 but occluded from view by the predicted volume 316 extending from the occlusion boundary surface 314 is likely not the same point in the environment as captured by the imaging device 146 and therefore should not be fused and/or labeled with the pixel 346 (or group of pixels) and their corresponding semantic label from the image data.

It should be understood that the determination of whether the projected ray 303, 313 intersects or travels behind the occlusion boundary surface 304, 314 and/or intersects the predicted volume 316 is an estimation to improve the fusing and assignment of semantic information between image data and depth data from non-collocated sensors.

Figure 4:
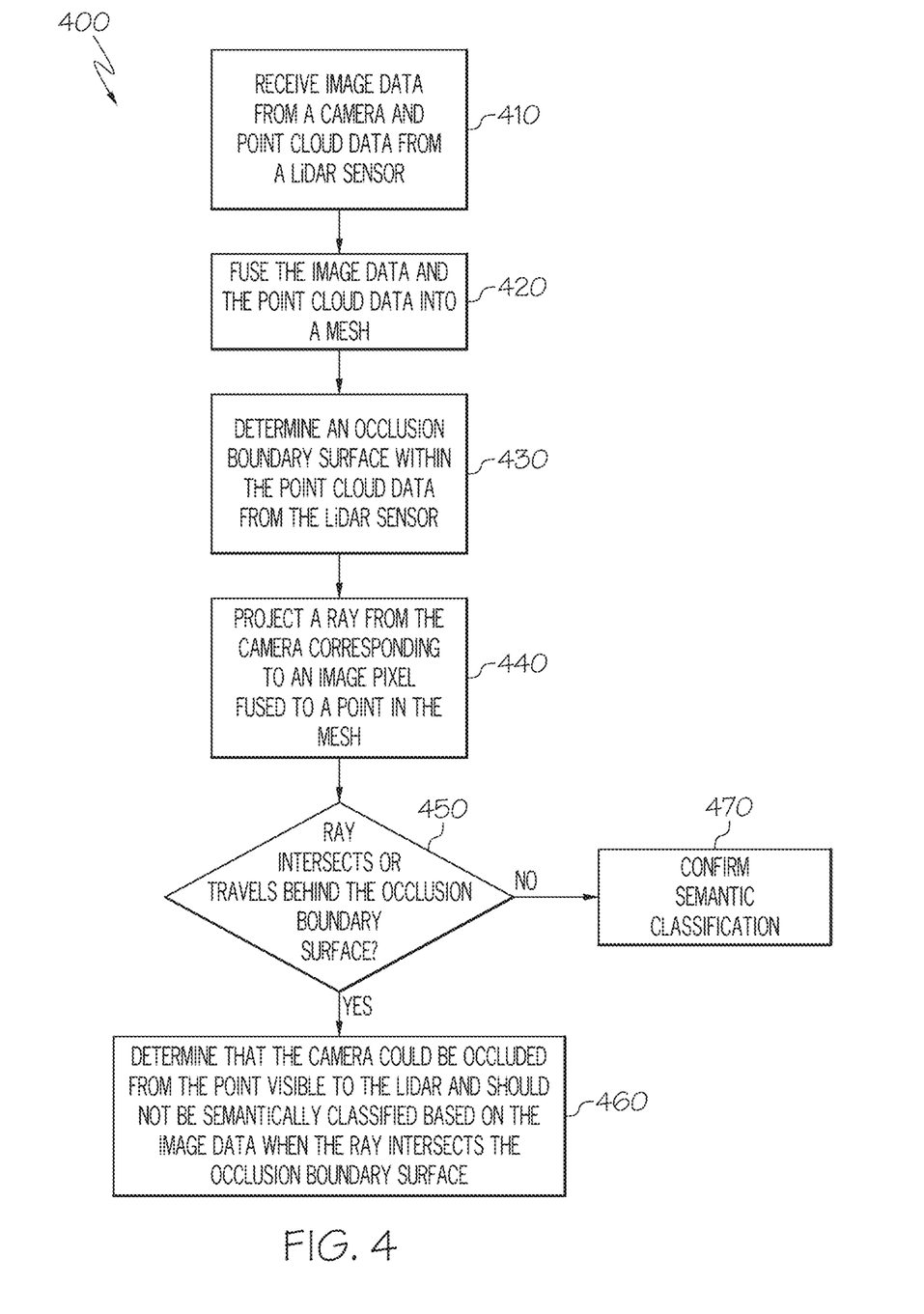
FIG. 4 depicts a flow diagram of an example method for addressing the parallax occlusion effect caused by non-collocated sensors according to one or more embodiments shown and described herein.

Referring now to FIG. 4, a flow diagram 400 of an illustrative method for addressing the parallax occlusion effect caused by non-collocated sensors is depicted. Some aspects of the methods have been described with reference to FIGS. 1, 2, 3A and 3B and reference will be made to components and features depicted in those figures as well as FIGS. 5, 6, and 7.

The method depicted and described with reference to FIG. 4 may be implemented by an electronic control unit 130 of a vehicle 110 or other device or apparatus such as a robot, aircraft, vessel, or the like. Additionally, while the flow diagram 400 depicts a number of ordered process blocks, it should be understood that several of the process blocks may be performed in various orders while accomplishing the same or similar result of addressing the parallax occlusion effect caused by non-collocated sensors. Additionally, the flow chart describes the method with reference to a camera as the imaging device 146 configured to generate image data of an environment and a LIDAR system as the depth sensor 148 configured to generate a point cloud of the environment.

At block 410, the electronic control unit 130 may cause the camera and LIDAR system to capture image data and depth data, respectively, of the environment. The captured image data and depth data may be transmitted from the sensors and received by the electronic control unit 130 over a predefined time period or on a continuous basis for processing and development into a semantically labeled mesh 600 (FIG. 6) (e.g., a 3D mesh of the environment). When the image data is received by the electronic control unit 130, the image data may be processed with a semantic labeling algorithm that detects and assigns semantic labels to a pixel or groups of pixels within the image data. At block 420, the electronic control unit 130 executes a fusion process where the image data (700, FIG. 7) and the depth data (500, FIG. 5) are fused into a mesh. The fusion process may include a process where a pixel or a group of pixels are correlated with the nearest point in the point cloud data. Furthermore, the fusion of the pixel or a group of pixels and the point in the point cloud data may be based at least in part on the geometric relationship between the positions of the camera with respect to the LIDAR system on the vehicle. Through the known or calibrated positional relationship between the camera with respect to the LIDAR system on the vehicle and other intrinsic and/or extrinsic values of each sensor, the image data and depth data may be aligned and fused. Furthermore, if necessary an interpolated flow and warping process may be applied to account for time variations in the sampling of the image data and points within the depth data (e.g., point cloud).

Figure 6:
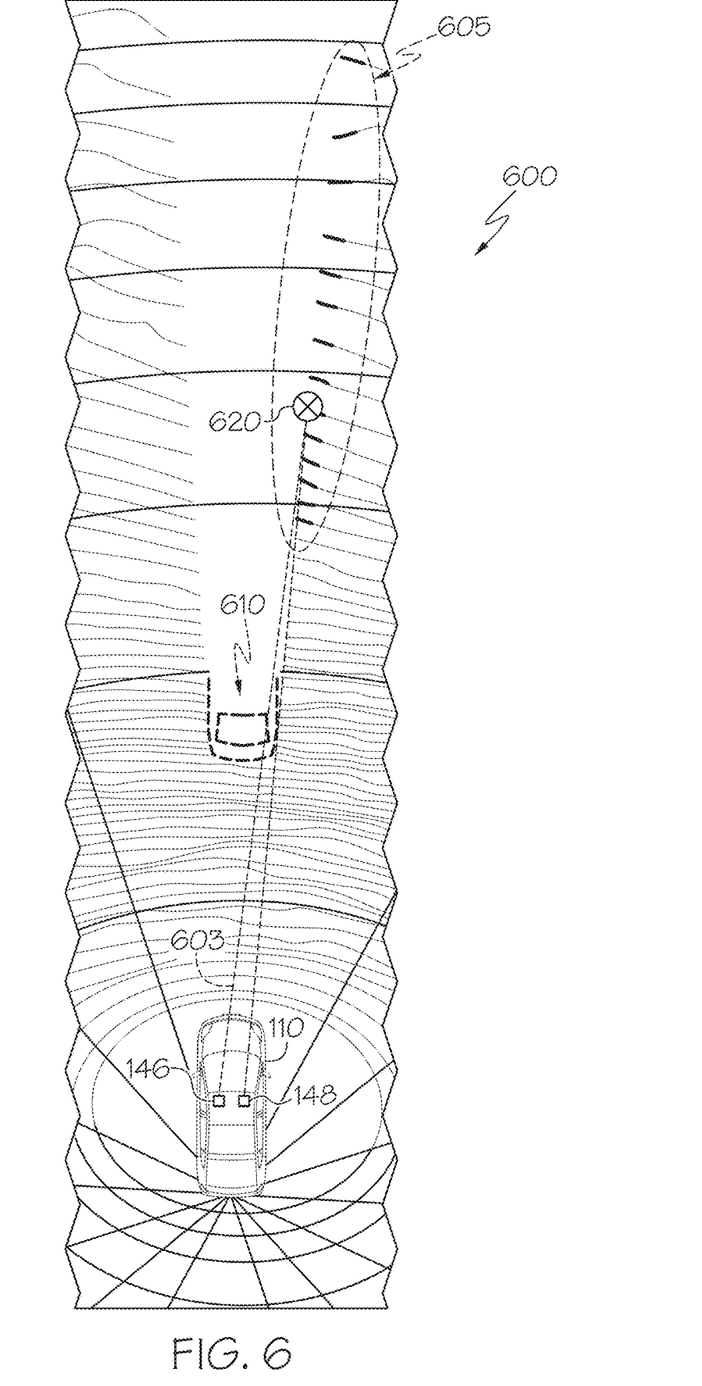
FIG. 6 depicts an illustrative mesh resulting from the fusion of image data and depth data according to one or more embodiments shown and described herein.

The fused pixel and point define a subspace of the mesh and metadata such as the distance from the point in the point cloud and the semantic label of the pixel may be combined to define the subspace of the mesh. In some embodiments, for example, as depicted in FIG. 6, the mesh may be depicted as a wire frame model where semantically different portions of the mesh are illustrated in different colors, textures, or similar means of distinguishing the semantic features therein. However, it should be understood that illustrating the mesh may not be necessary when the mesh is not visually presented to a user or another system. In other cases, the mesh may be stored as one or more matrices within the memory of the electronic control unit 130 for use by other vehicle systems, such as an autonomous navigation system, a collision avoidance system, or the like.

At block 430, the electronic control unit 130 further analyzes the points in the point cloud to determine one or more occlusion boundary surfaces based on the position of points relative to each other and their distances from the LIDAR system. In some embodiments, the electronic control unit 130 may further predict a volume extending from an occlusion boundary surface by using semantic information associated with the corresponding pixel's semantic information within the mesh. It is noted that since the fusion of the pixel and point defining the mesh may be incorrect, the electronic control unit 130 may sample more than one of points defining the occlusion boundary surface to more accurately predict the semantic information for the occlusion boundary surface. Based on the predicted semantic label for the occlusion boundary surface, the electronic control unit 130 can further predict a volume to extend from the occlusion boundary surface. For example, if the occlusion boundary surface is predicted through semantic information to be a rear of a vehicle, then an average length and height of a vehicle may be applied to define a volume extending from the occlusion boundary surface. At block 440, the electronic control unit 130 projects a ray from the camera position to the fused pixel and point within the mesh. Since the pixel is fused with a point from the point cloud (e.g., depth data) the pixel includes depth information. Additionally, the camera includes a known focal length, angle of view, and other known optical parameters. Therefore, by combining the focal length, angle of view, and/or the distance measurement (e.g., optionally adjusted for the non-collocated position between the camera and LIDAR system), a projected ray into the 2.5D or 3D mesh may be generated by the electronic control unit 130.

At block 450, the electronic control unit 130 determines whether the projected ray intersects or travels behind the occlusion boundary surface and/or the predicted volume extending from an occlusion boundary surface. When the electronic control unit 130 determines that the projected ray does not intersect or travel behind the occlusion boundary surface and/or intersect the predicted volume extending from an occlusion boundary surface, "NO" at block 450, the electronic control unit 130, at block 470, may confirm with a higher degree of certainty that the fused image data and point cloud data for that point and pixel or group of pixels is correctly fused and correctly semantically classified. However, when the electronic control unit 130 determines that the projected ray intersects or travels behind the occlusion boundary surface and/or intersects the predicted volume extending from an occlusion boundary surface, "YES" at block 450, the electronic control unit 130 determines, optionally with a degree of certainty, which may be less than 100%, that the fused image data and point cloud data for that point and pixel or group of pixels defining the portion of the mesh to not correspond and should not be fused, at block 460. That is, at block 460, the electronic control unit 130 determines that it is likely that the camera is occluded by the occlusion boundary surface and/or the predicted volume extending from an occlusion boundary surface from viewing the surface in the environment that is associated with the point from the point cloud obtained by the LIDAR system.

In response, the electronic control unit 130 may raise a flag altering the system 100 to the possibility that the fused data may be incorrect. The electronic control unit 130 may further be configured to cause the pixel and point to be disconnected from each other in the mesh. In some embodiments, the electronic control unit 130 determines a level of certainty with its determination that it is likely that the camera is occluded by the occlusion boundary surface and/or the predicted volume extending from an occlusion boundary surface. The level of certainty may be a percentage value, for example, based on the how well defined the occlusion boundary surface is. In other words, if the occlusion boundary surface is defined by a few sparsely located points in the point cloud and, for example, near the predefined maximum separation value, then a determination that the camera is occluded by the occlusion boundary surface would be assigned a lower certainty, for example, 50% to 75% likelihood. On the other hand, if the occlusion boundary surface is well defined by numerous points in the point cloud, then a determination that the camera is occluded by the occlusion boundary surface may be assigned a high certainty, for example, 90% to 99% likelihood.

Other factors may also contribute to the certainty level of the determination that the camera is occluded by the occlusion boundary surface or the predicted volume extending from an occlusion boundary surface, such as when the projected ray is determined to intersect with the predicted volume extending from an occlusion boundary surface. Since the predicted volume is an estimate, then depending on where the projected ray intersects with the predicted volume may further inform the certainty level. For example, if the projected ray intersects with the predicted volume near the edges of the volume, then the certainty level may decreased because there is a possibility that the estimated volume is not accurately representing the actual volume of the object defining the occlusion boundary surface (e.g., size and shape of the detected vehicle). Moreover, in some embodiments, more weight towards certainty may be applied when the projected ray is determined to intersect the predicted volume at locations closer to the occlusion boundary surface than locations farther away from the occlusion boundary surface.

In some embodiments, a user or manufacturer of the system may select and set a level of certainty which causes the electronic control unit 130 to take particular action when the certainty level of the determination is above, at, or below the preset level of certainty. For example, if the certainty level is below a preset level of certainty, the electronic control unit 130 may cause the pixel and point to be disconnected from each other in the mesh. If the certainty level is above a preset level of certainty, the electronic control unit 130 may confirm with a higher degree of certainty that the fused image data and point cloud data for that point and pixel or group of pixels is correctly fused and correctly semantically classified. In some embodiments, the set level of certainty may include a range, and when the certainty level is determined to be within the range, the electronic control unit 130 may cause a flag to be raised to the system indicating there is a potential mistake in the fusing of the image data and point cloud. The flag may cause any decisions such as navigation or collision avoidance decisions to seek out additional data points in the mesh to make a determination, so that the decisions or further actions by the system or device implementing the system are not based on a questionable fusion of data.

The functional blocks and/or flowchart elements described herein may be translated onto machine-readable instructions. As non-limiting examples, the machine-readable instructions may be written using any programming protocol, such as: (i) descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Figure 5:
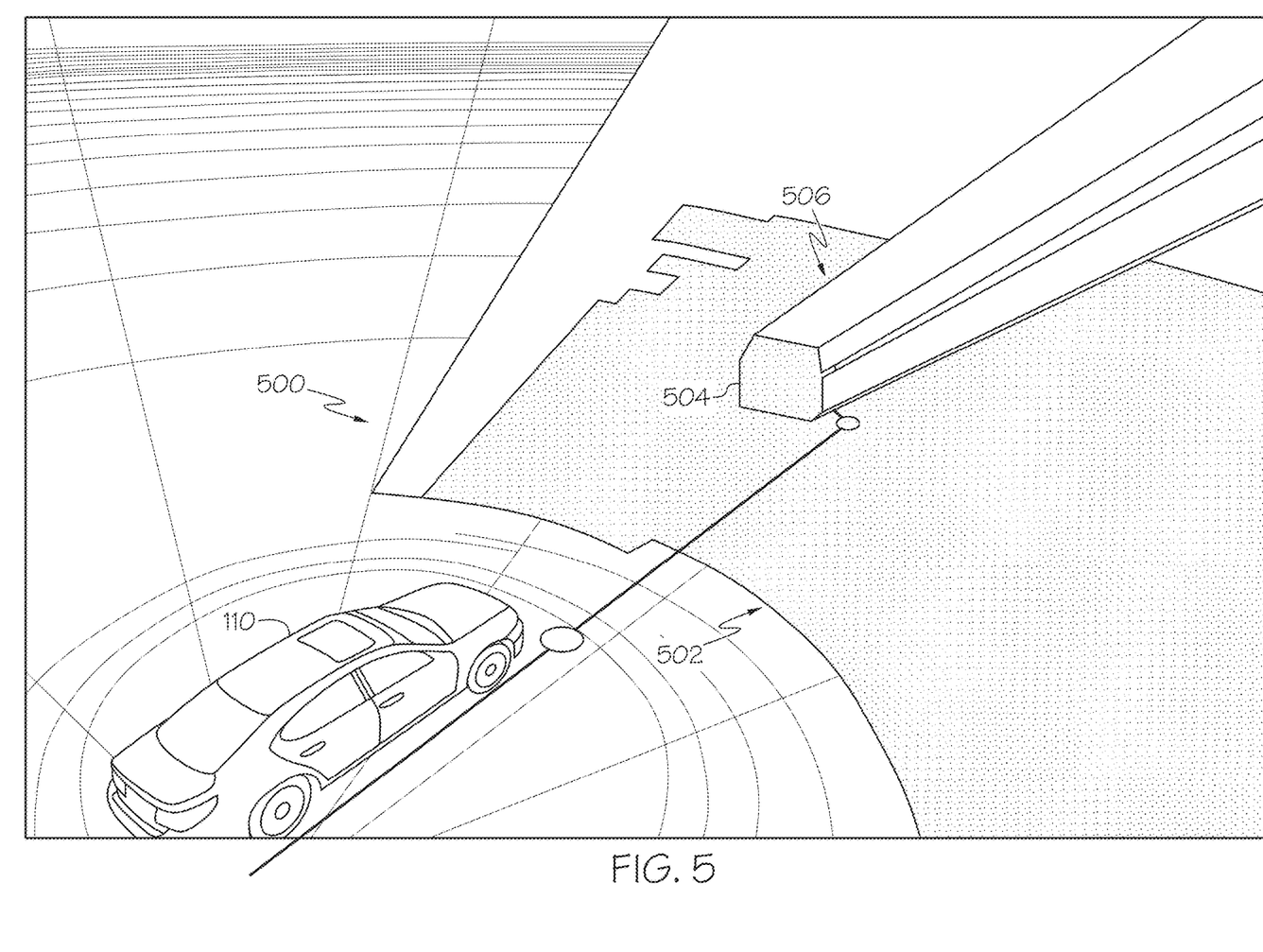
FIG. 5 depicts an illustrative example of depth data according to one or more embodiments shown and described herein.
Figure 7:
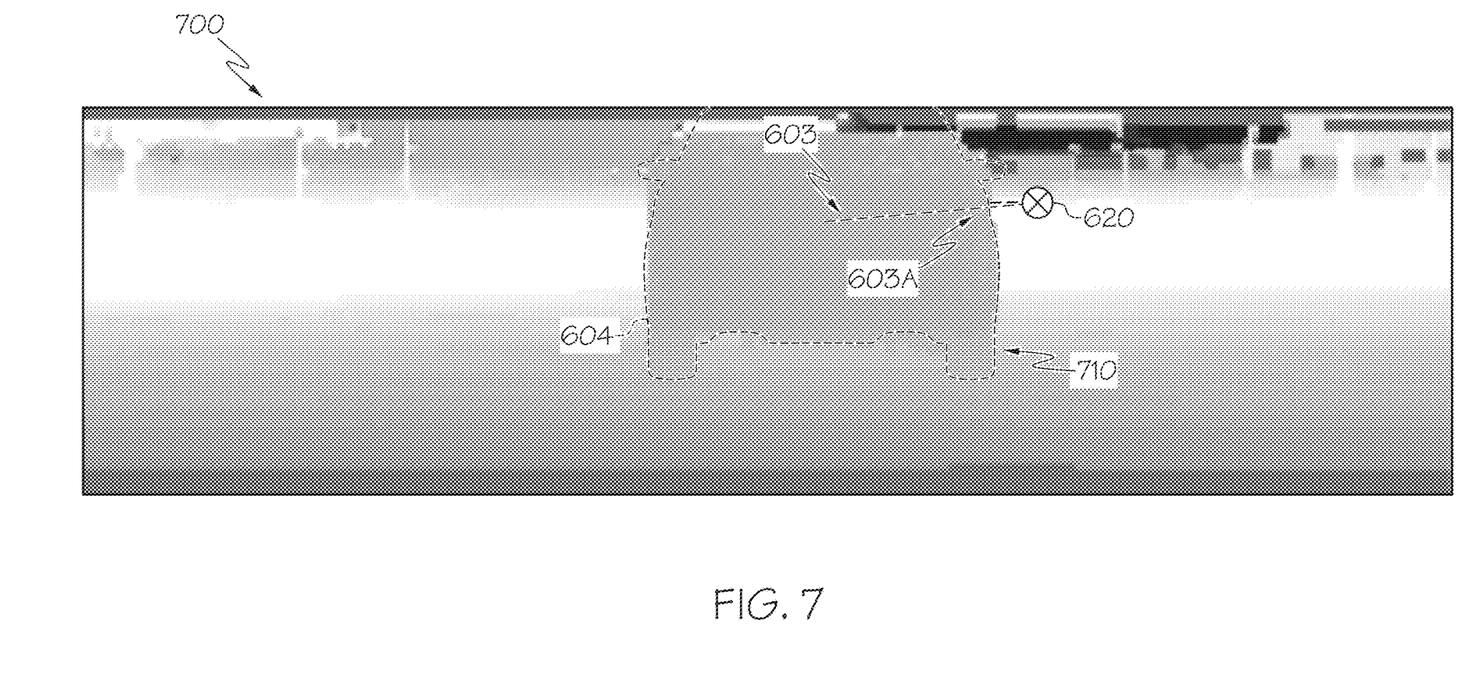
FIG. 7 depicts an illustrative example of image data fused with depth data according to one or more embodiments shown and described herein.

Turning to FIGS. 5-7, illustrative graphical representations of data obtained by the sensors and fused by the system are depicted. FIG. 5 depicts an illustrative environment around a vehicle 110 where depth data 500 such as point cloud data is graphically depicted. Point cloud data identified in a first portion 502 represents the ground or street surrounding the vehicle 110. The second portion 504 represents a vertical like surface extending from the ground or street surrounding the vehicle 110 an in front of the vehicle 110. Without semantic information the depth data merely represents surfaces about the depth sensor 148 positioned on the vehicle 110. Some analysis of depth data may lend itself to a rough estimation of a classification of an object but when depth data is fused with image data a more vivid depiction, for example in the form of a mesh or wire frame rendering of an environment may be obtained. For example, a determined occlusion boundary surface 504 may be estimated to have an infinitely extending volume 506 or no volume at all, when the predicted volume is estimated based on the depth data alone.

Referring to FIG. 6, an illustrative mesh resulting from the fusion of the image data (e.g., image data 700 depicted in FIG. 7) and the depth data 500 graphically represented in FIG. 5 is depicted. The mesh is semantically labeled, where the thin wire frame lines represent the ground and the bold wire frame lines represent a vehicle 610. Additionally, as depicted there is a portion 605 of the mesh where the ground has been misclassified as a vehicle. This is caused by one or more of the complications resulting from non-collocated sensors. While the depth sensor 148 has an un-occluded view of point 620 in the mesh, the imaging device 146, determined from the path of the projected ray 603 from the camera to the point 620 in the mesh has an occluded view of the that point because it passes through the occlusion boundary surface defined by the vehicle 610. The systems and methods described herein provide technics for identifying when the imaging device 146 is occluded so the incorrect semantic labeling of portions such as portion 605 may be avoided or at least minimized.

Referring now to FIG. 7, image data 700 obtained from one or more imaging devices 146, for example, positioned on a vehicle 110 is depicted. Moreover, FIG. 7 is an example of a 2.5D mesh. For example as shown, the variations in grayscale depict different depths within the image data. An occlusion boundary surface 710 corresponding to the occlusion boundary surface formed by the presence of the leading vehicle 610 in FIG. 6 is depicted. Additionally, the projected ray 603 from the camera to the point 620 in the mesh is shown. The discontinuity 603A of the projected ray 603 represents the intersection of the projected ray 603 and the occlusion boundary surface 710. In such an instance the electronic control unit 130 may determine that the camera is likely occluded from viewing (e.g., capturing image data) for the surface associated with point 620.

Embodiments described herein provide techniques for addressing the parallax occlusion effect caused by non-collocated sensors. It should be understood, through the figures and description herein, that some systems include a controller, and an imaging device and a depth sensor 148 communicatively coupled to the controller. The controller is configured to receive image data from the imaging device and depth data from the depth sensor 148, fuse the image data and the depth data forming a mesh, project a ray from the imaging device to a pixel of the image data fused with a point of the depth data forming the mesh, determine an occlusion boundary surface within the depth data, determine whether the ray intersects or travels behind the occlusion boundary surface, and in response to determining that the ray intersects or travels behind the occlusion boundary surface, determine that the imaging device is occluded from a fused point in the mesh.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A controller configured to:
   fuse image data received from an imaging device and depth data received from a depth sensor to form a mesh;
   project a ray from the imaging device to a pixel of the image data fused with a point of the depth data forming the mesh;
   determine an occlusion boundary surface within the depth data; and
   in response to determining that the ray intersects the occlusion boundary surface, determine that the imaging device is occluded from a fused point in the mesh.

2. The controller of claim 1, further configured to determine a certainty level of the determination that the ray intersects the occlusion boundary surface.

3. The controller of claim 2, further configured to:
   disconnect the pixel fused with the point from the depth data within the mesh, when the certainty level is greater than a preset level of certainty.

4. The controller of claim 1, further configured to:
   in response to determining that the ray intersects the occlusion boundary surface, update a semantic label associated with the fused point such that the fused point is not assigned the semantic label of the pixel of the image data fused with the point of the depth data defining the fused point.

5. The controller of claim 1 further configured to:
   predict an occlusion volume extending from the occlusion boundary surface;
   determine whether the ray intersects the occlusion volume; and
   in response to determining that the ray intersects the occlusion volume, determine that the imaging device is occluded from the fused point in the mesh.

6. The controller of claim 5, further configured to:
   in response to; determining that the ray intersects the occlusion volume, update a semantic label associated with the fused point such that the fused point is not assigned the semantic label of the pixel of the image data fused with the point of the depth data defining the fused point.

7. The controller of claim 5, wherein the determination that the ray intersects the occlusion volume further includes determining a certainty level of the determination that the ray intersects the occlusion volume.

8. The controller of claim 7, further configured to:
   disconnect the pixel fused with the point from the depth data within the mesh, when the certainty level is greater than a preset level of certainty.

9. The controller of claim 1, wherein further configured to:
   semantically classify the image data, and
   assign a semantic label to the pixel or a group of pixels in the image data.

10. The controller of claim 9, wherein fusing the image data and the depth data into the mesh includes assigning the semantic label of the pixel of the image data to the fused point in the mesh.

11. A method comprising:
    fusing image data received from an imaging device and depth data received from a depth sensor to form a mesh;
    projecting a ray from the imaging device to a pixel of the image data fused with a point of the depth data forming the mesh;
    determining an occlusion boundary surface within the depth data; and
    in response to determining that the ray intersects the occlusion boundary surface, determine that the imaging device is occluded from a fused point in the mesh.

12. The method of claim 11, further comprising:
    determining a certainty level of the determination that the ray intersects the occlusion boundary surface.

13. The method of claim 12, further comprising:
    disconnecting the pixel fused with the point from the depth data within the mesh, when the certainty level is greater than a preset level of certainty.

14. The method of claim 11, further comprising:
    in response to determining that the ray intersects the occlusion boundary surface, updating a semantic label associated with the fused point such that the fused point is not assigned the semantic label of the pixel of the image data fused with the point of the depth data defining the fused point.

15. The method of claim 11, further comprising:
    predicting an occlusion volume extending from the occlusion boundary surface;
    determining whether the ray intersects the occlusion volume; and
    in response to determining that the ray intersects the occlusion volume, determining that the imaging device is occluded from the fused point in the mesh.

16. The method of claim 15, further comprising:
    in response to determining that the ray intersects the occlusion volume, updating a semantic label associated with the fused point such that the fused point is not assigned the semantic label of the pixel of the image data fused with the point of the depth data defining the fused point.

17. The method of claim 15, wherein determining that the ray intersects the occlusion volume further includes determining a certainty level of the determination that the ray intersects the occlusion volume.

18. The method of claim 17, further comprising:
disconnecting the pixel fused with the point from the depth data within the mesh, when the certainty level is greater than a preset level of certainty.

19. A vehicle comprising:
a controller; and
an imaging device and a depth sensor communicatively coupled to the controller,
wherein the controller is configured to:
- receive image data from the imaging device and depth data from the depth sensor,
- fuse the image data and the depth data forming a mesh,
- project a ray from the imaging device to a pixel of the image data fused with a point of the depth data forming the mesh,
- determine an occlusion boundary surface within the depth data,
- determine whether the ray intersects the occlusion boundary surface, and
- in response to determining that the ray intersects the occlusion boundary surface, determine that the imaging device is occluded from a fused point in the mesh.

20. The vehicle of claim 19, wherein the determination that the ray intersects the occlusion boundary surface further includes determining a certainty level of the determination that the ray intersects the occlusion boundary surface.

* * * * *

UNITED STATES PATENT AND TRADEMARK OFFICE
CERTIFICATE OF CORRECTION

| | |
|---|---|
| PATENT NO. | : 12,014,525 B2 |
| APPLICATION NO. | : 17/143562 |
| DATED | : June 18, 2024 |
| INVENTOR(S) | : Jonathan A. Daudelin and Matthew T. Kliemann |

Page 1 of 1

It is certified that error appears in the above-identified patent and that said Letters Patent is hereby corrected as shown below:

In the Specification

In Column 5, Line(s) 35, before "couple", delete "to".

In Column 5, Line(s) 47, delete "traverses" and insert --traverse--, therefor.

In Column 7, Line(s) 24, delete "process" and insert --processes--, therefor.

In Column 7, Line(s) 53, before "independent", insert --an--.

In Column 8, Line(s) 64, after "to", delete "the".

In Column 10, Line(s) 4, delete "exist" and insert --exists--, therefor.

In Column 10, Line(s) 14, after "to", delete "the".

In Column 10, Line(s) 26, after "may", delete "be".

In Column 13, Line(s) 26, delete "decreased" and insert --decrease--, therefor.

Signed and Sealed this
Eighteenth Day of March, 2025

Coke Morgan Stewart
*Acting Director of the United States Patent and Trademark Office*